United States Patent
Peyroux

(10) Patent No.: US 7,460,996 B2
(45) Date of Patent: Dec. 2, 2008

(54) USING STRONG DATA TYPES TO EXPRESS SPEECH RECOGNITION GRAMMARS IN SOFTWARE PROGRAMS

(75) Inventor: Jean-Francois Peyroux, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 219 days.

(21) Appl. No.: 11/159,648

(22) Filed: Jun. 23, 2005

(65) Prior Publication Data

US 2006/0293894 A1    Dec. 28, 2006

(51) Int. Cl.
*G10L 15/18* (2006.01)
(52) U.S. Cl. ...................................... 704/257
(58) Field of Classification Search ................. 704/257
See application file for complete search history.

(56) References Cited

U.S. PATENT DOCUMENTS

| | | | |
|---|---|---|---|
| 6,022,222 A * | 2/2000 | Guinan | 434/169 |
| 6,311,159 B1 * | 10/2001 | Van Tichelen et al. | 704/275 |
| 6,314,398 B1 * | 11/2001 | Junqua et al. | 704/257 |
| 6,553,345 B1 * | 4/2003 | Kuhn et al. | 704/275 |
| 6,654,955 B1 * | 11/2003 | Kusnitz et al. | 717/163 |
| 6,934,684 B2 * | 8/2005 | Alpdemir et al. | 704/265 |
| 7,027,991 B2 * | 4/2006 | Alexander et al. | 704/275 |
| 7,133,830 B1 * | 11/2006 | Hoban et al. | 704/270.1 |
| 7,171,352 B2 * | 1/2007 | Chang et al. | 704/9 |

OTHER PUBLICATIONS

Search Report from Application No. PCT/US06/17588, filed May 8, 2006, mailed Sep. 13, 2007, 2 pages.

* cited by examiner

*Primary Examiner*—Susan McFadden
(74) *Attorney, Agent, or Firm*—Westman, Champlin & Kelly, P.A.

(57) ABSTRACT

In one embodiment, a system for interpretation of natural language inputs to natural language enabled applications has a grammar, a source file, and a speech recognizer. The grammar has a set of data types and semantic code defining rules about the set of data types. The source file includes computer readable code adapted to access the grammar by instantiating selected data types of the set of data types. The speech recognizer is adapted to receive natural language input and to map the natural language input to the selected data types.

19 Claims, 7 Drawing Sheets

USING STRONG DATA TYPES TO EXPRESS SPEECH RECOGNITION GRAMMARS IN SOFTWARE PROGRAMS

BACKGROUND

The discussion below is merely provided for general background information and is not intended to be used as an aid in determining the scope of the claimed subject matter.

Natural language software applications refer to applications adapted to receive spoken utterances or text input that parallel the way a person speaks. However, conventional applications that use speech recognition do so by defining the words for which the application should listen, by defining how those words can be combined, and by defining the semantic meaning of any particular combination of those words.

Generally, the term grammar refers to the rules and underlying principles that define the structure of any given language, and grammar can serve as the mechanism by which natural language applications perform these functions. In practice, the natural language programmer codes the grammar, which is then consumed by a speech recognizer. When a user accesses the natural language program and says something that is within the set of words and rules defined by the grammar, the speech recognizer maps those words to the strings or other types defined within the grammar. The speech recognizer then informs the application what was said, as well as any corresponding semantic information as defined by the grammar, often by providing mapped objects to the application for further processing.

Such conventional applications require the software developer to code for a great deal of text and string text manipulation. In order to code effectively, the developer needs to have a very good understanding of grammars in general and of the inner workings of the particular grammar that the developer is using. Unfortunately, such grammatical insight often is not part of the programmer's knowledge base.

To speed the overall development cycle, developers often want to use some variant of an existing grammar, by editing the existing grammar and/or adding to it. However, editing an existing grammar requires the developer to spend time learning the structure, which is time that could otherwise be spent implementing software enhancements. Though conventional technology allows a developer to reference an existing grammar from another grammar, the reference is not transparent to the calling program because it effects the way in which the semantics of the referenced grammar are returned.

SUMMARY

This summary is provided to introduce in a simplified form some concepts, which are described below in the Detailed Description. This Summary is not intended to identify key features or essential features of the claimed subject matter, nor is this Summary intended to be used as an aid in determining the scope of the claimed subject matter.

In one embodiment, a system for interpretation of natural language inputs to natural language enabled applications has a grammar, a source file, and a speech recognizer. The grammar has a set of data types and semantic code defining rules about the set of data types. The source file includes computer readable code adapted to access the grammar by instantiating selected data types of the set of data types. The speech recognizer is adapted to receive natural language input and to map the natural language input to the selected data types.

In another embodiment, a system for natural language input recognition has an input device, a strongly typed grammar, a recognition component, and an interpretation component. The input device is adapted to receive a natural language input. The strongly typed grammar defines a set of types representative of elements of a natural language input. The recognition component is adapted to convert the natural language input into text using the strongly typed grammar and to generate a recognition output based on the text. The interpretation component is adapted to identify semantics of the natural language input based on the recognition output.

In another embodiment, a method for accessing grammars for natural language applications is provided. One or more grammars are provided. Each grammar has a set of types representative of a natural language. Processes are defined in one or more source code files for operating on a natural language input. Selected types of the set of types are instantiated from the one or more grammars at runtime. The selected types correspond to a natural language input.

DETAILED DESCRIPTION

Figure 1:
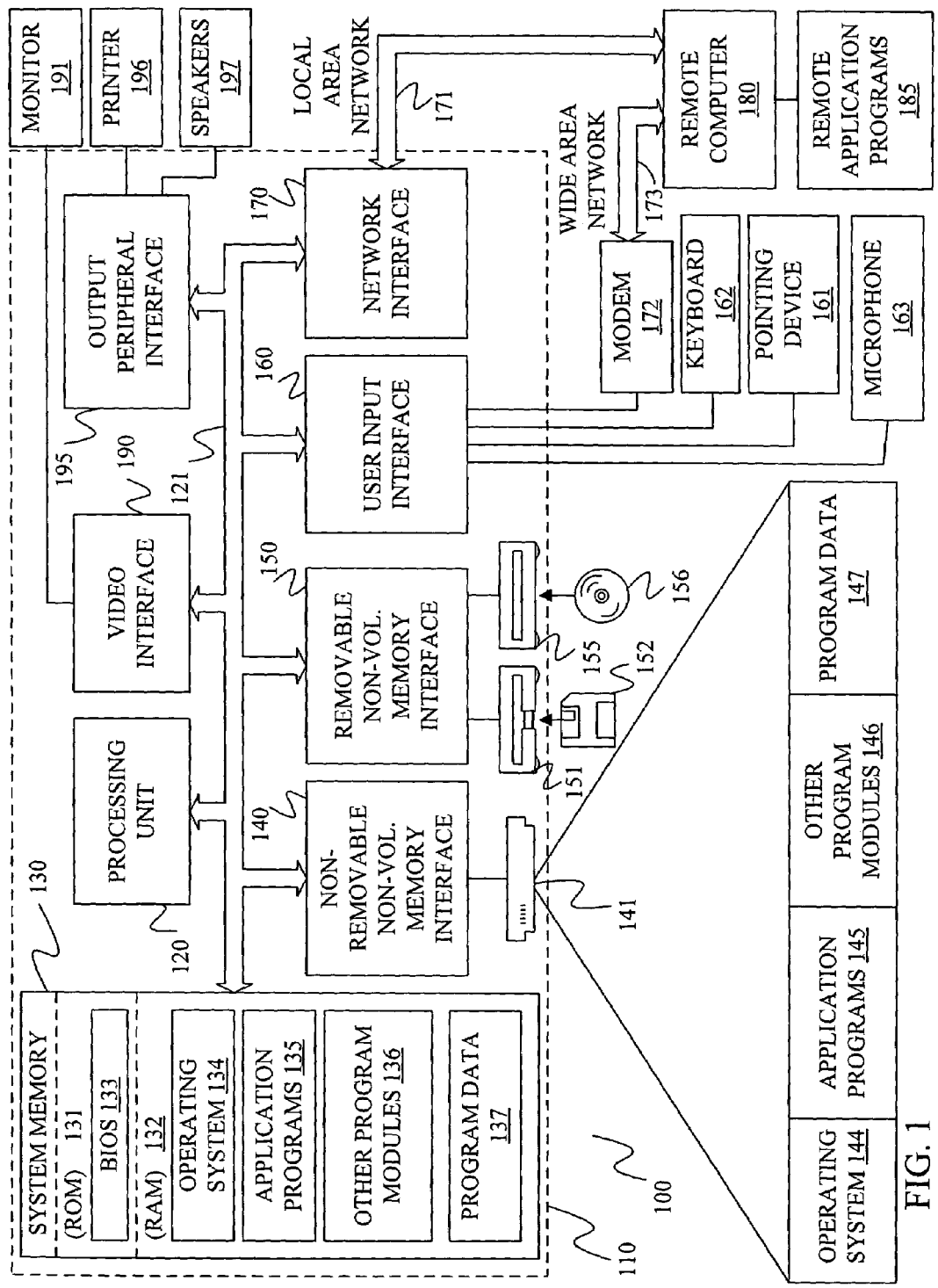
FIG. 1 is a diagrammatic view of a computing system environment on which embodiments of the present invention may be implemented.

FIG. 1 illustrates an example of a suitable computing system environment 100 on which embodiments of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments of the invention are operational with numerous other general purpose or special purpose computing system environments or configurations. Examples of well-known computing systems, environments, and/or configurations that may be suitable for use with such embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments of the invention may be described in the general context of computer-executable instructions, such as program modules, being executed by a computer. Generally, program modules include routines, programs, objects, components, data structures, and the like. That perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing embodiments of the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. The phrase "computer storage media" is intended to include both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

In one embodiment, speech recognition grammars and results are expressed as data types (such as "classes" in object-oriented parlance). While conventional natural language programming applications express grammars as text strings or binary data structures, strongly typed grammars can instead be used to perform natural language functions. Generally, the phrase "strongly typed" refers to how the language or grammar handles data types. As used herein, a strongly typed grammar or language is one in which all types can be checked at compile time.

Generally, application developers define grammars either by making a series of application program interface (API) calls to add words and rules to a speech recognizer, or by creating a text file (such as an extensible Markup Language or XML file format, for example). Once such format is the World Wide Web Consortium's (W3C) Speech Recognition Grammar Specification (SRGS). The text file typically contains the grammar, which is compiled to a state machine by the underlying speech recognizer.

Figure 2:
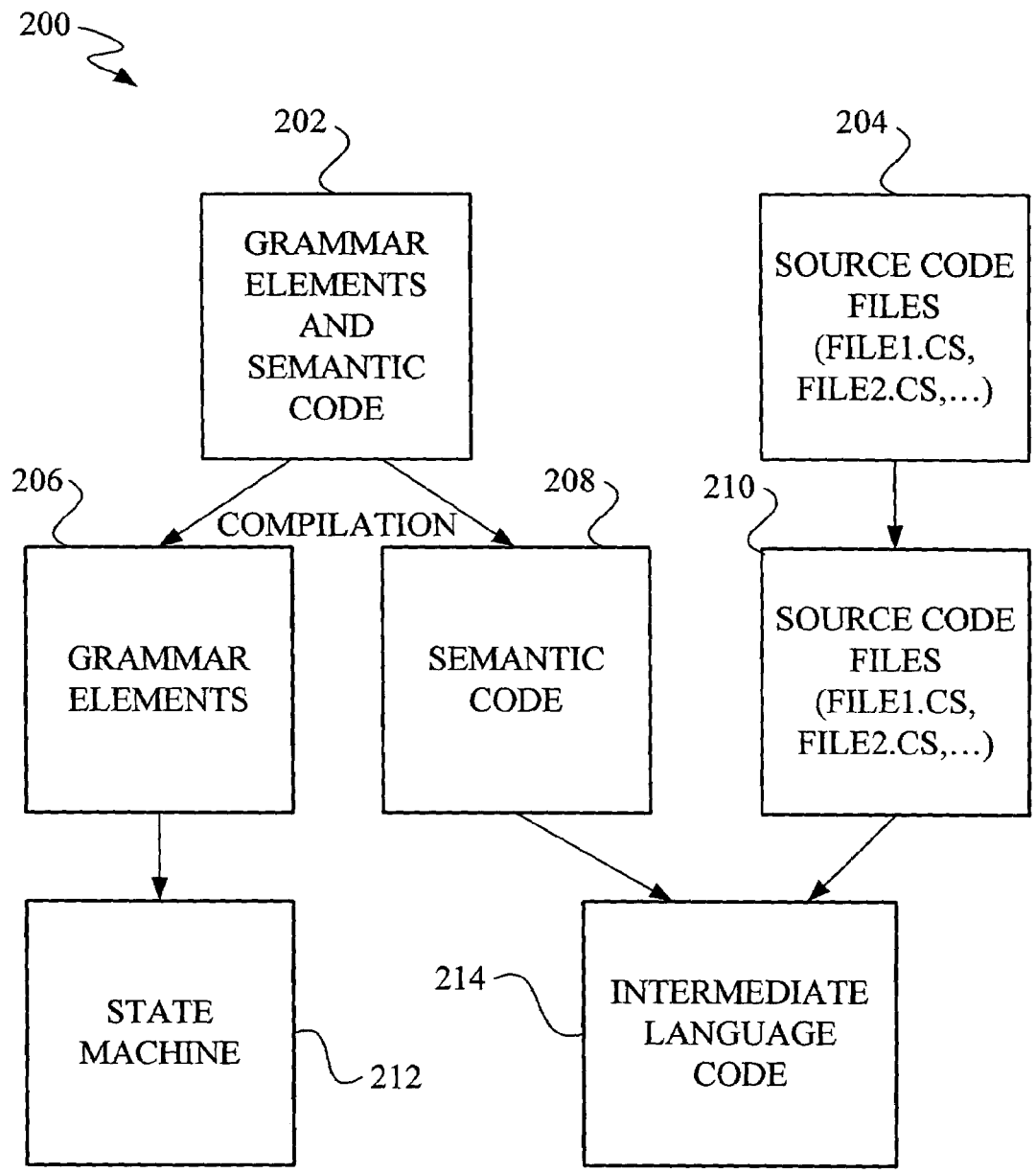
FIG. 2 is a simplified block diagram of a compilation process for a natural language grammar according to an embodiment of the present invention.

FIG. 2 is a simplified block diagram of elements 200 of an embodiment of a strongly typed grammar during different stages of a compilation process. The elements 200 include grammar elements and semantic code 202 and source code files 204. The grammar elements and semantic code 202 define a set of types (or "classes") for expressing speech recognition grammars and results as data types. The source code files 204 define a set of procedures for processing natural language input against a specific application. The grammar elements and semantic code 202, for example, can comprise an SRGS grammar. The source code files 204 can comprise, for example, one or more C# source code files.

The semantic information can be coded in either the source code files 204 or in the grammar elements and semantic code 202, depending on the specific implementation. During compilation, if the semantic information is coded in the grammar elements and semantic code 202, a grammar compiler separates the file into grammar elements 206 and semantic code 208. The source code files 204 are then loaded into the compiler and combined with the semantic code 208 to produce an intermediate language code 214. The grammar elements are compiled to a state machine 212. The intermediate language code 214 and the state machine 212 can be, for example, binary files, which can be consumed by a speech recognizer.

By separating the grammar elements 206 (sequence of words to listen for) from the semantics code 208 (rules about what the words mean), the binary files are simplified such that the state machine 212 contains all of the possible transitions or permutations, and the intermediate language code 214 contains the semantic processing information.

In general, the grammar compiler can generate a compiled form grammar (CFG) file or a class library. Generally, the CFG file contains the state machine 212, the intermediate language code 214, and any debugging information. Generally, the CFG file requires casting of results from a dictionary of semantic values, for example.

A class library represents a strongly typed grammar that contains the intermediate language code 214 and the state machines 212. Debugging information may be stored in a separate file (not shown). The class library makes it possible for all of the linguistic versions of a grammar for different cultures to be stored in the same file. This removes the need for a speech application developer to have knowledge of the spoken language of the grammar he is using. For example, a speech application developer can code for both English and Spanish, without having any knowledge of Spanish. Moreover, types defined within the grammar can be shared by a speech application, and results are returned as fields and properties on a grammar object.

In this instance, strongly typed grammars are packaged in a dynamic link library (dll), which is a file type that is well-known to the anti-virus filters, to the email filters and the like. If the strongly typed grammars are packaged in a DLL, application code, such as NET semantics code, can access all the resources that the speech application can access.

In this instance, the developer can program natural language applications with little knowledge of grammars in general and with no knowledge of the inner workings of the particular grammar they are using. Moreover, the developer interacts with grammars as native data types rather than by manipulating input strings and parsing output strings.

In one embodiment, properties are created using tags. For example, a property associated with a month of the year can be coded as follows:

<item>February<tag>"month"=2</tag></item>.

This code snippet associates the integer value of 2 with the tag for the item February. Thus, if a user selects the item "February" from a pull-down list, for example, the property "2" is assigned to the tag "month".

Properties can be combined to create strongly typed compound objects. For example, a DateTime object can be returned from the intermediate results. For example:

return(new DateTime (result["year"], result["month"], result ["day"]).

Objects and properties can be re-combined based on parent rules to build a final result. In general, strongly-typed compound objects are built during semantic processing and returned to the speech application.

The above-discussion has largely been directed to the processing (generation) of semantic results performed by an author of a natural language application. The source code is compiled and checked as part of the grammar compilation process. Most coding errors can be found at this stage, and the precise location of the error can be identified. Moreover, debugging information can be stored, breakpoints can be set directly in the source file, the content of any variable can be viewed, and any debugger can be used, including VS.net, Rascal, and the like.

Figure 3:
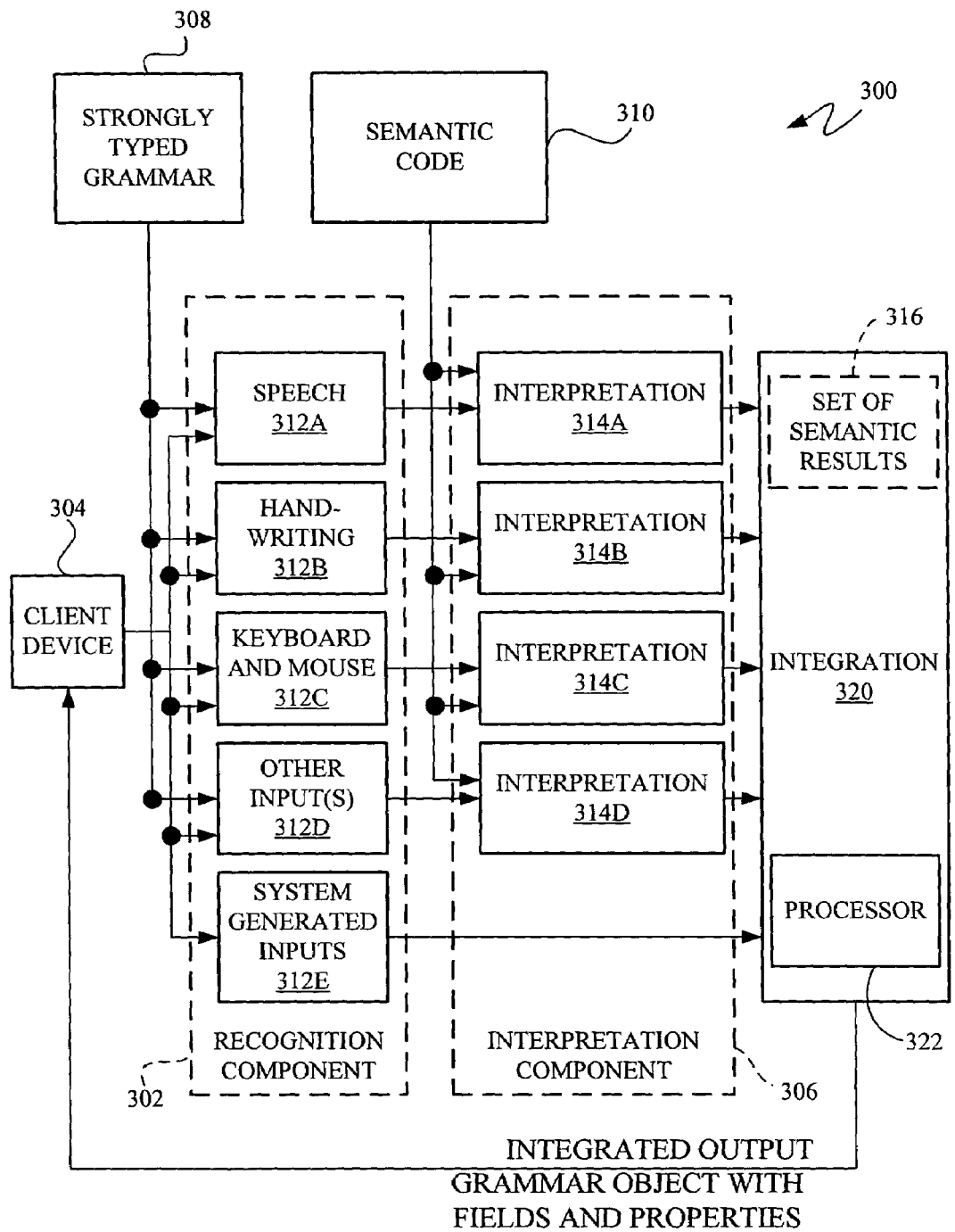
FIG. 3 is a simplified block diagram illustrating input components of a natural language system according to an embodiment of the present invention.

FIG. 3 is a simplified block diagram illustrating an embodiment of a natural language system 300 at design time for a natural language application. The system 300 includes a natural language recognition component 302 and an interpretation component 306 coupled to a client input device 302. The client input device 304 can be a microphone, a pen-based input device, a keyboard and mouse, or any other input mechanism. Generally, the natural language recognition component 302 captures natural language input from a user, and translates the input into a form that can be used for later processing. The natural language recognition component 302 uses a strongly typed grammar 308 described by a grammar markup language (such as XML, SRGS, and the like). The natural language recognition component 302 can include speech recognition component 312A, hand-writing recognition component 312B, keyboard and mouse components 312C, other input(s) 312D, and system generated inputs 312E. Each recognition component 312A-312D of the natural language speech recognizer 302 converts the natural language input into text using the strongly typed grammar 308 to tag (or categorize) the text based on types defined within the strongly-typed grammar.

The tagged or categorized words are then passed to the interpretation component 306. More specifically, each recognition component 312A-312D passes its categorized words to a respective interpretation component 314A-314D. Each interpretation component 314A-314D utilizes the semantic code 310 to identify "meaning" or "semantics" intended by the user, based on the tagged user input from the respective recognition component 302 (312A-312D). At this point, the input data from the client device 304 are mapped to types defined within the strongly typed grammar 308 based on rules defined within semantic code 310. The interpretation component 306 provides a set of semantic results 316 (text-to-type mappings) to an integration component 320. The integration component 320 includes a processor 322 that is adapted to process the set of semantic results against a schema or other system generated inputs 312 in order to select types from the set of semantic results 316 that can be used by the client device 304. Thus, type mappings that do not map to natural language features defined within a client application on the client device 304 would be discarded and appropriate mappings can be combined into an integrated output. The integrated output is then returned to the client device 304 for use by a client application. In one embodiment, the integrated output comprises one or more grammar objects with associated fields and properties, which are representative of the natural language input.

By using strongly typed grammars, the benefits of a type-based system are available to the developer for natural language programming, such as more errors found at compile time, reuse through inheritance and encapsulation, abstraction of implementation detail, and the like. This allows a developer to interact with the grammar as native data types. To use a grammar, the developer need only declare and instantiate the grammar type, set whatever properties the type exposes, and pass the instantiated type to the speech recognizer. The developer need not manage the grammar file. Instead, every setting that is adjustable by the developer is visible as part of the external interface of the type. Moreover, strongly typed grammars allow the developer to parameterize the grammar at runtime, through standard programming techniques, such as constructor overload, exposed properties, and the like. Instantiating a grammar with a set of parameters can be accomplished in a single simple sentence. In other words, a grammar can be parameterized and rebuilt on the fly, at runtime, based on a set of runtime parameters. Additionally, use of strongly-typed grammars allows a developer to construct multi-lingual grammars, without having to learn the rules and underlying principles that define the structure of the various languages. Thus, a speech application developer can code against one language (English for example) and, transparently, the same code works for variations of the same grammar for an another language (such as Spanish, for example).

It should be understood that the tags or categories defined within the strongly-typed grammar 308 can be used by the recognizer 302 to mark or otherwise label recognized inputs. These marked or labeled inputs can then be processed against the developer defined semantic code 310 by the interpretation component 306 to produce a set of semantic results 316. Preferably, the set of semantic results 316 correspond to the input intended by the operator of the client device 304. The integrated output can be used by the client device 304 to perform an operation intended by the user.

Figure 4:
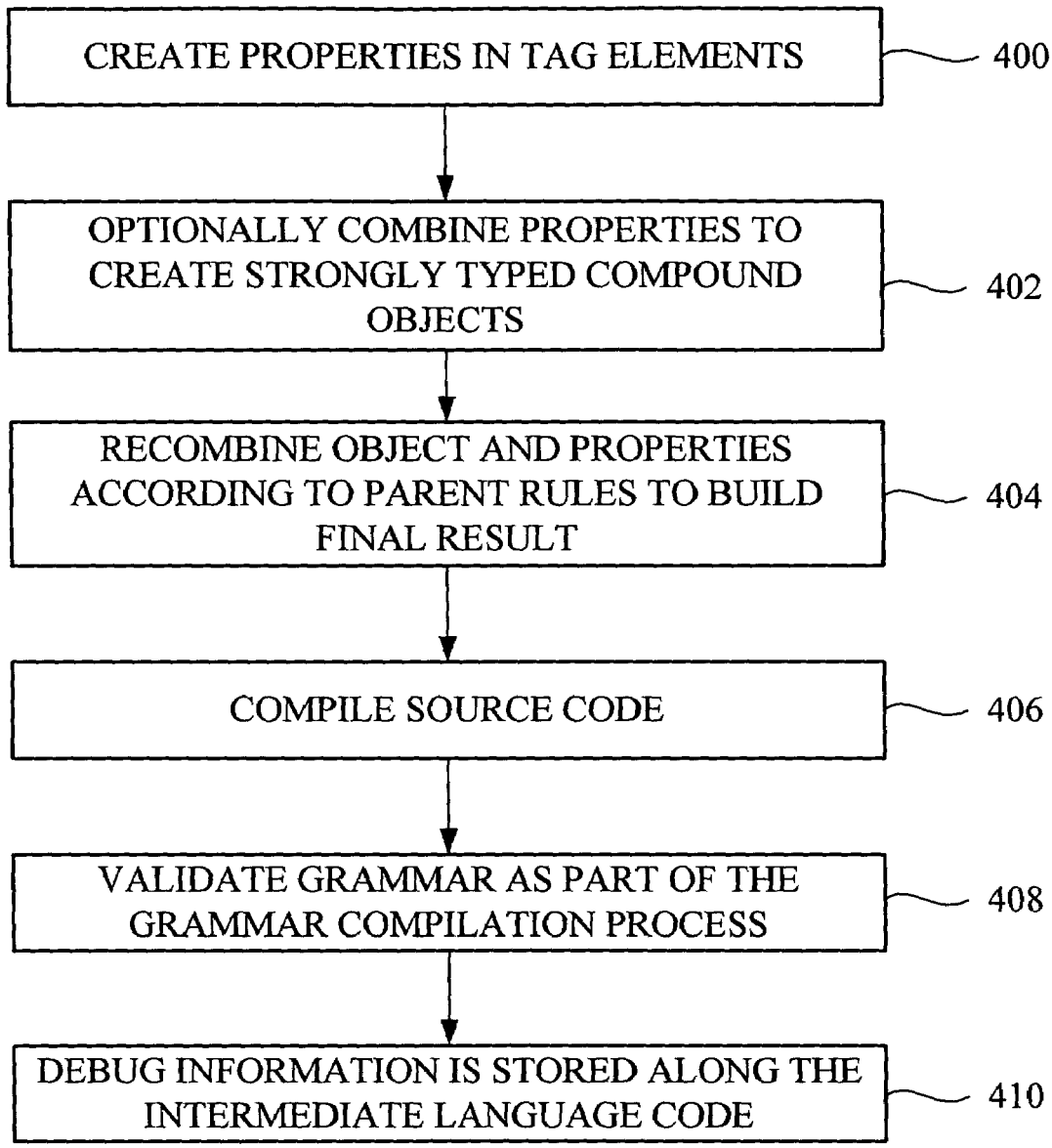
FIG. 4 is a simplified flow diagram of a process for programming strongly typed grammars according to an embodiment of the present invention.

FIG. 4 is a simplified flow diagram of an embodiment of a process for programming strongly typed grammars. A developer creates properties in tag elements defining grammar objects (step 400). Optionally, the properties can be combined to create strongly typed compound objects (step 402). Optionally, the strongly typed compound objects can be recombined according to parent rules to build a final result (step 404). The source code is compiled using a grammar compiler (step 406). The grammar is validated as part of the grammar compilation process (step 408). Finally, debug information is stored along with an intermediate language code output (step 410).

Figure 5:
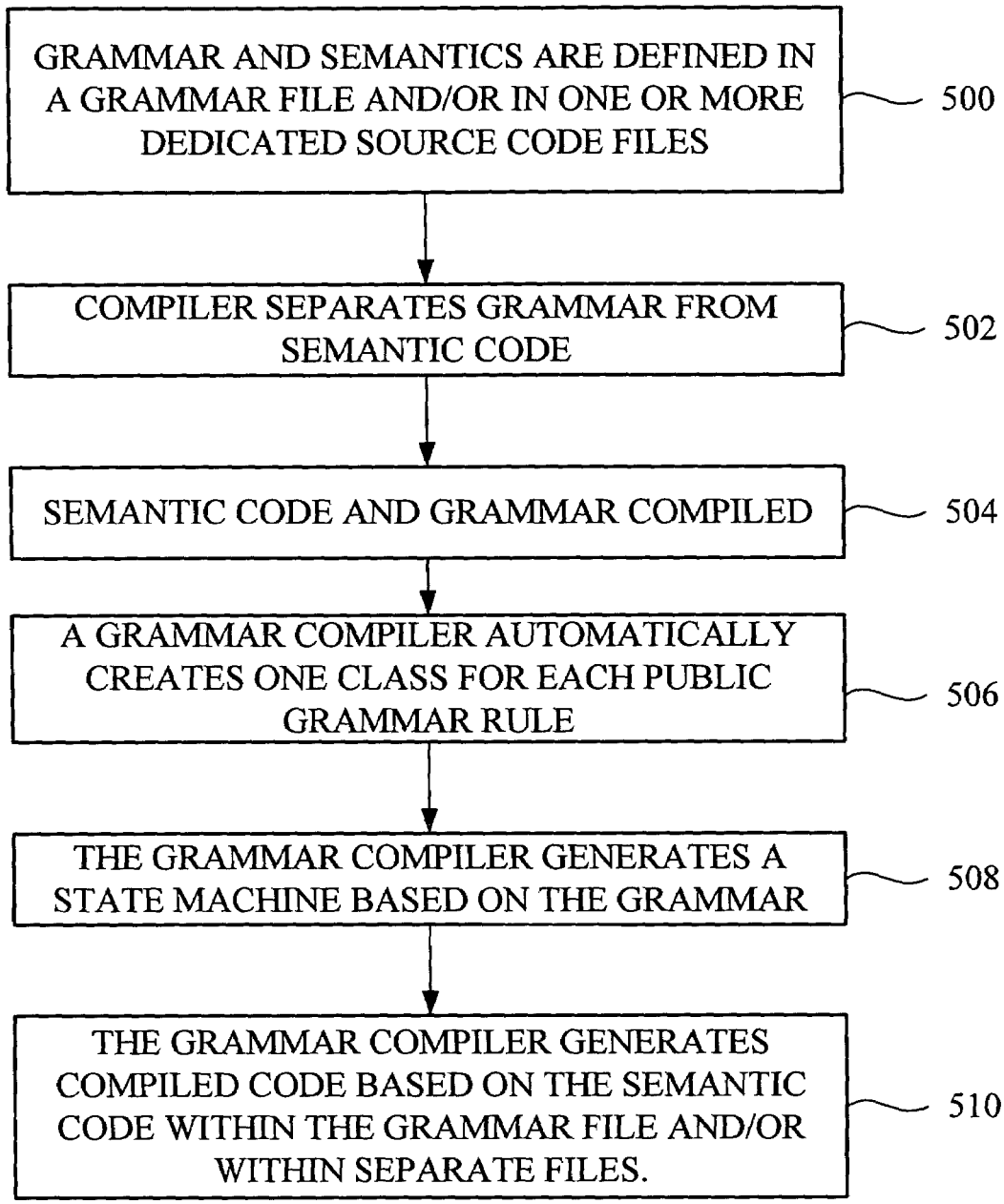
FIG. 5 is a simplified flow diagram of a compilation process for programming natural language programs using strongly typed grammars according to an embodiment of the present invention.

FIG. 5 is a simplified flow diagram of an embodiment of a compilation process for programming natural language programs using strongly typed grammars. A grammar is defined in one or more dedicated source code files and/or in a grammar file, together with semantics code (step 500). The compiler separates the grammar from the semantic code (step 502). The grammar and associated semantic code are compiled (step 504). A grammar compiler automatically creates a class for each public grammar rule (step 506). The grammar compiler generates a state machine based on the grammar (step 508). Finally, the grammar compiler generates compiled intermediate language code based on the code within the grammar file and/or within the one or more dedicated source code files (step 510).

Figure 6:
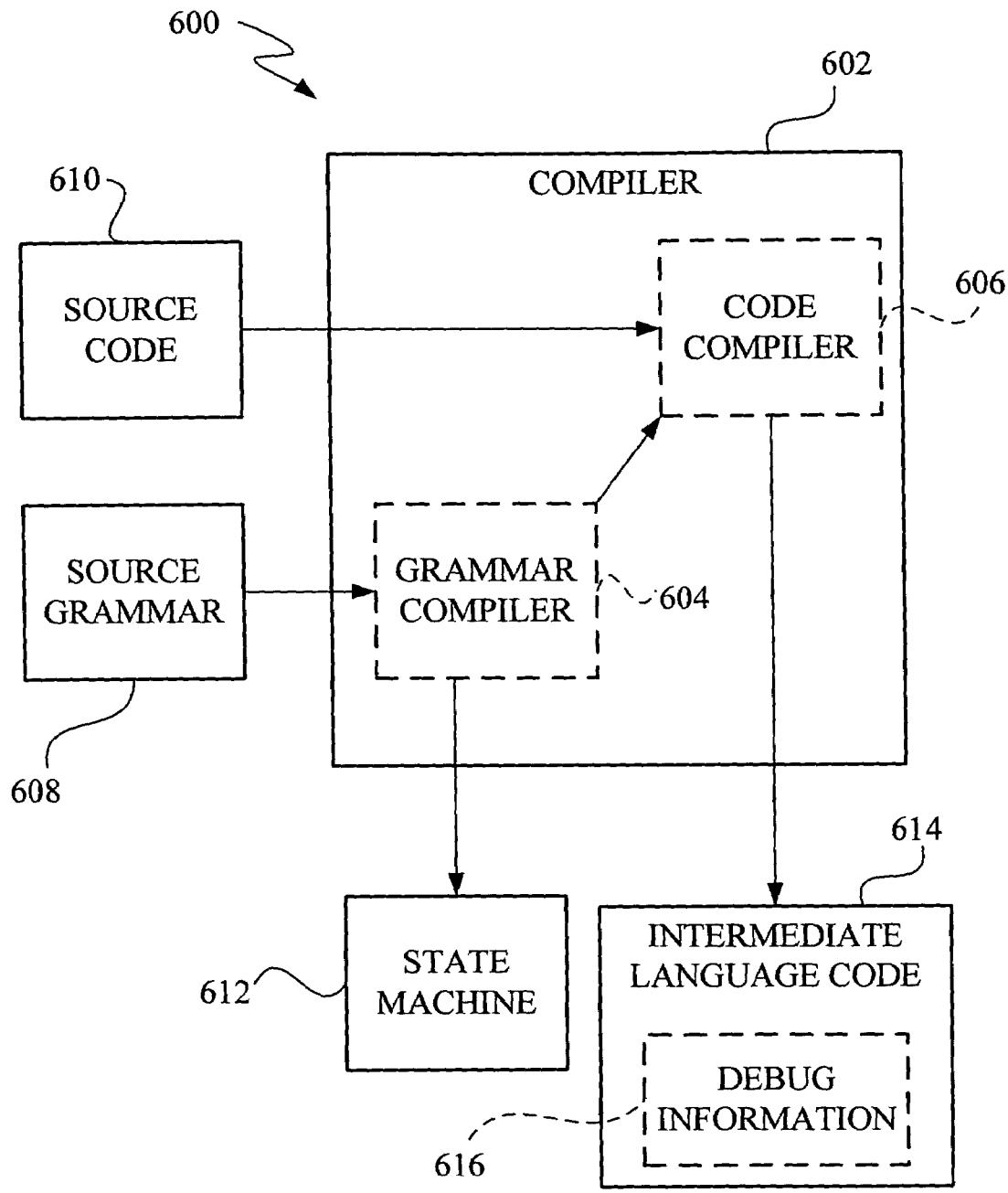
FIG. 6 is a simplified block diagram of a compiler system adapted to compile a natural language state machine and intermediate language code according to an embodiment of the present invention.

FIG. 6 is a simplified block diagram of an embodiment of a compiler system 600 adapted to compile a natural language state machine and intermediate language code. The system 600 includes a compiler 602 comprised of a grammar compiler 604 and a code compiler 606. The grammar compiler 604 is adapted to receive a source grammar file 608, which can include both grammar and semantic code. The grammar compiler 604 is adapted to separate semantic code from grammar code and to compile the grammar code into a state machine 612. The grammar compiler 604 provides the separated semantic code to the code compiler 606.

The code compiler 606 is adapted to receive one or more source code files 610 and the separated semantic code from the grammar compiler 604. The code compiler 606 is adapted to compile the one or more source code files 610 with the separated semantic code into an intermediate language code 614, which can include debug information 616. In some instances, the debug information 616 can be stored in a separate file.

Strongly typed grammars allow a developer to reference an existing grammar from another grammar. By allowing a developer to instantiate a grammar as a type, developers can readily re-use and extend existing grammars using standard object-oriented programming techniques or methods, such as subclass and aggregation.

While conventional techniques provide no simple way to recognize dates or to restrict to a date range based on text files, a strongly-typed grammar can be implemented in such a way that it can accept parameters at run time through standard programming techniques, such as constructor overload or exposed properties. A grammar can then be instantiated with a set of parameters in a single simple statement. This allows a developer, for example, to restrict a date range.

Figure 7:
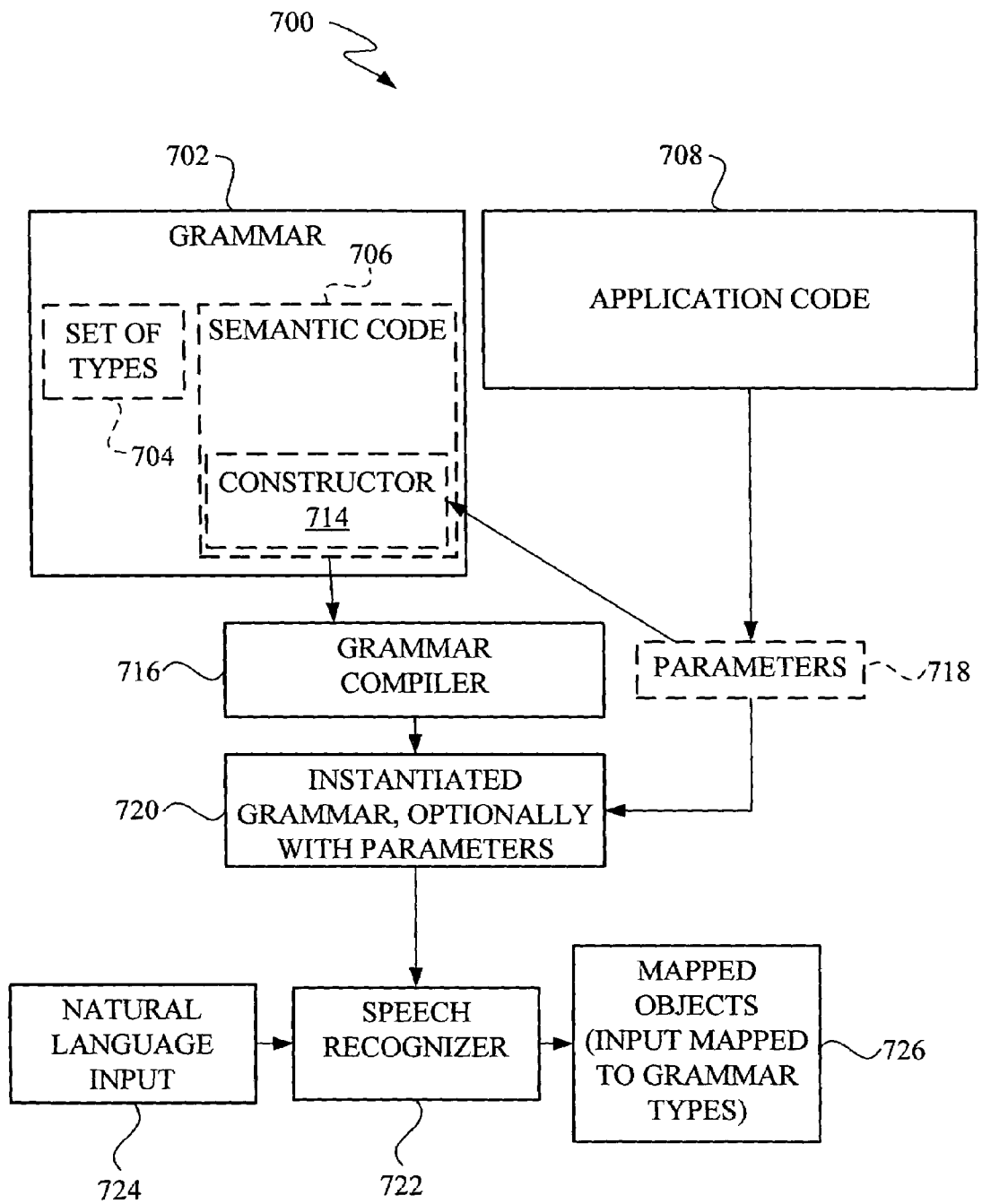
FIG. 7 is a simplified block diagram illustrating elements for instantiating a grammar according to an embodiment of the present invention.

FIG. 7 is a simplified block diagram of an embodiment of a system 700 for instantiating a grammar. The system 700 includes a grammar 702 and an application code 708. The grammar 702 is preferably comprised of a set of types 704, which are strongly typed. The grammar 702 can also include semantic code 706, which can include one or more constructors 714. Application code 708 calls constructor 714 using parameters 718. Constructor 714 rebuilds its state machine using grammar compiler 716 based on the set of parameters 718.

A grammar compiler 716 is adapted to compile the grammar 702 based on the parameters 718 called from the application code 708. Particular instances of types from the set of types 704 can be instantiated based on a constructor 714 or other code within the application code 708 with parameters 718. The parameters 718 can place specific requirements on the particular instantiation. Moreover, the resulting instantiated grammar (optionally with parameters) 720 includes properties the type exposes. The instantiated grammar 720 can then be passed to the speech recognizer 722. The speech recognizer 722 is adapted to receive a natural language input 724 and to map the natural language input 724 to the instantiated types within the instantiated grammar 720 to generate mapped objects 726.

The developer need not manage the grammar 702. Instead, every setting that is adjustable by the developer is visible as part of the external interface of the type, accessible via the constructor 714, for example. Such strongly typed grammars allow the developer to parameterize the application at runtime, through standard programming techniques, such as constructor overload, exposed properties, and the like. Moreover, instantiated types can inherit properties from a base type in the set of types. Thus, embodiments of the present invention provide a familiar object-oriented set of types 704 or classes for programming natural language applications, thereby allowing the developer to focus on program features, rather than the inner workings of the grammar.

Although the present invention has been described with reference to particular embodiments, workers skilled in the art will recognize that changes may be made in form and detail without departing from the spirit and scope of the invention.

What is claimed is:

1. A system for interpretation of natural language inputs to natural language enabled applications comprising:
    a grammar comprising a set of object-oriented data types and semantic code defining rules about the set of data types, wherein the set of object-oriented data types includes a plurality of classes;
    a source file comprised of computer readable code to access the grammar by instantiating selected data types of the set of object-oriented data types with one or more parameters to produce strongly-typed grammars with associated parameters; and
    a speech recognizer to receive natural language input and to map the natural language input to strongly-typed grammars according to the associated parameters, and wherein the speech recognizer generates a recognition output based on the mapping.

2. The system of claim 1 further comprising:
    a grammar compiler to receive the grammar and to separate the set of data types from the semantic code, wherein the grammar compiler generates a strongly typed grammar based on the grammar.

3. The system of claim 2 wherein the strongly typed grammar comprises a state machine.

4. The system of claim 1 wherein the selected data types are instantiated with the one or more parameters at runtime.

5. The system of claim 1 further comprising:
    a code compiler to receive a source code file and the source file and to compile the source code and the source file into an intermediate language code.

6. The system of claim 5 wherein the intermediate language code comprises computer readable code and associated debug information.

7. A system for natural language input recognition comprising:
    an input device configured to receive a natural language input;
    a grammar compiler configured to generate a strongly typed grammar comprising a dynamic link library defining a set of object-oriented data types representative of elements of a natural language, wherein the dynamic link library comprises a state machine containing multiple linguistic versions of a grammar as categories and an intermediate language code comprising semantic processing information and debugging information;
    a recognition component configured to convert the natural language input into text using the state machine to categorize the text based on types defined within the dynamic link library of the strongly typed grammar and to generate a recognition output based on the text, the recognition output comprising categorized words of the natural language input; and
    an interpretation component configured to receive the categorized words and to identify semantics of the natural language input based on the categorized words.

8. The system of claim 7 wherein the semantic processing information defines meanings of types within the strongly typed grammar.

9. The system of claim 8 wherein the interpretation component utilizes the semantic processing information to identify semantics of the natural language input based on the grammar.

10. The system of claim 7 wherein the recognition component is configured to convert the natural language input into text specified in the grammar.

11. The system of claim 7 wherein the interpretation component comprises one or more interpretation components, each interpretation component configured to generate a possible interpretation of the natural language input, the system further comprising:
    an integration component configured to integrate a respective one or more possible interpretations of the natural language input generated by the one or more interpretation components, wherein the integration component includes a processor configured to select types from the identified semantics that can be used by a client device, wherein types that cannot be used by the client device are discarded and types that can be used by the client device are combined into an integrated output grammar object with fields and properties, wherein the integrated output grammar object is configured for use by a client application on the client device.

12. The system of claim 7 wherein the natural language input comprises speech.

13. The system of claim 7 wherein the natural language input comprises hand-writing.

14. The system of claim 7 further comprising:
    application code defined within a grammar file containing the strongly typed grammar and within one or more dedicated source code files, wherein the grammar compiler generates the strongly typed grammar from the one or more dedicated source code files.

15. A method for accessing grammars for natural language applications comprising:
    providing one or more grammars, each grammar comprising a set of object-oriented data types representative of a natural language;
    defining processes for operating on a natural language input in one or more source code files;
    instantiating selected data types of the set of object-oriented data types with one or more parameters to produce strongly-typed grammars with associated parameters at runtime, the selected types corresponding to a natural language input;
    receiving the natural language input and mapping the natural language input to the strongly-typed grammars according to the associated parameters; and
    generating a recognition output based on the mapping.

16. The method of claim 15 further comprising:
compiling the grammar into a state machine using a grammar compiler; and
providing the state machine and semantic code associated with the selected types to a speech recognizer.

17. The method of claim 15 wherein the step of instantiating further comprises:
creating one class for each public grammar rule within the one or more grammars using a grammar compiler.

18. The method of claim 15 wherein each grammar further comprises semantic code associated with the set of object-oriented data types.

19. The method of claim 15 wherein the selected data types inherit properties from the grammar based on a data type definition.

* * * * *